United States Patent [19]

Cairns

[11] Patent Number: 4,677,702
[45] Date of Patent: Jul. 7, 1987

[54] WIRE INSULATION STRIPPER GUIDE

[75] Inventor: Thomas M. Cairns, Birmingham, Mich.

[73] Assignee: Ford Motor Company, Dearborn, Mich.

[21] Appl. No.: 819,784

[22] Filed: Jan. 17, 1986

[51] Int. Cl.$^4$ .............................................. H02G 1/12
[52] U.S. Cl. ............................................ 7/107; 30/90.1; 81/9.44
[58] Field of Search ................... 81/9.4, 9.44; 30/90.1; 7/107

[56] References Cited

U.S. PATENT DOCUMENTS

| | | |
|---|---|---|
| 1,530,037 | 3/1925 | Dadmun . |
| 2,704,000 | 3/1955 | Miller . |
| 2,753,742 | 7/1956 | Buchanan . |
| 2,787,925 | 4/1957 | Buchanan ............................... 7/107 |
| 2,991,675 | 7/1961 | Ustin . |
| 3,002,407 | 10/1961 | Johnson . |
| 3,058,377 | 10/1962 | Hardt ...................................... 7/107 |
| 3,167,107 | 1/1965 | Ustin et al. . |
| 3,199,334 | 8/1965 | Holmes et al. . |
| 3,234,776 | 2/1966 | Stoltz . |
| 3,713,322 | 1/1973 | Fischer . |
| 3,738,150 | 6/1973 | Holmes et al. . |
| 4,028,756 | 6/1977 | Couto ...................................... 7/107 |
| 4,047,297 | 9/1977 | Hanson ................................. 30/90.1 |
| 4,246,808 | 1/1981 | Sandy et al. ......................... 30/90.1 |

OTHER PUBLICATIONS

IBM Technical Disclosure Bulletin, Manual Wire Stripper, J. Cioffi, Jr., vol. 13, No. 8, pp. 2134, 1/1971.

Primary Examiner—Roscoe V. Parker
Attorney, Agent, or Firm—Paul K. Godwin, Jr.; Clifford L. Sadler

[57] ABSTRACT

An alignment guide for use with a die cutter for stripping insulation from electrical wire containing sized apertures corresponding to appropriate cutting sizes of the underlying die cutter to ensure appropriate wire size insertion and to prevent strand removal when the wire is withdrawn from the insulation die cutter.

2 Claims, 3 Drawing Figures

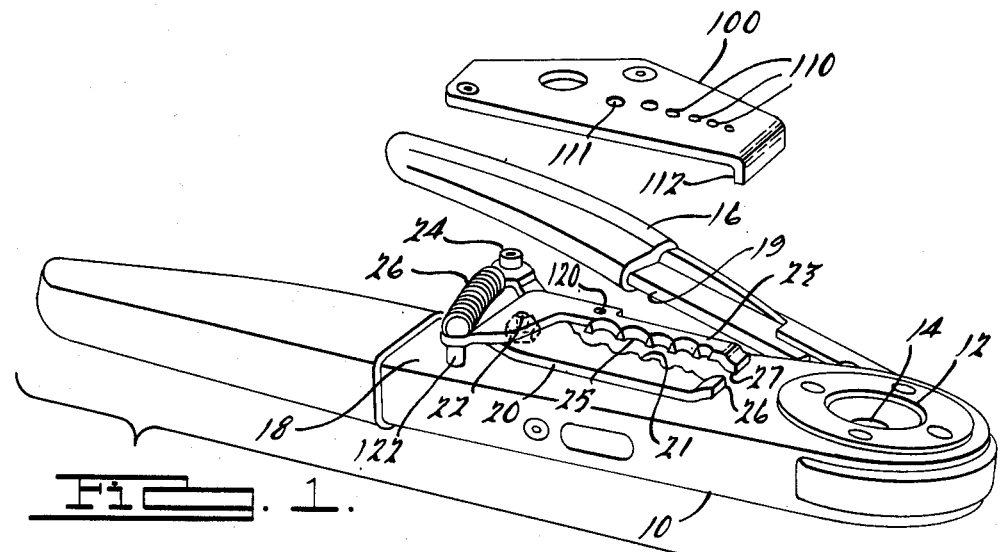
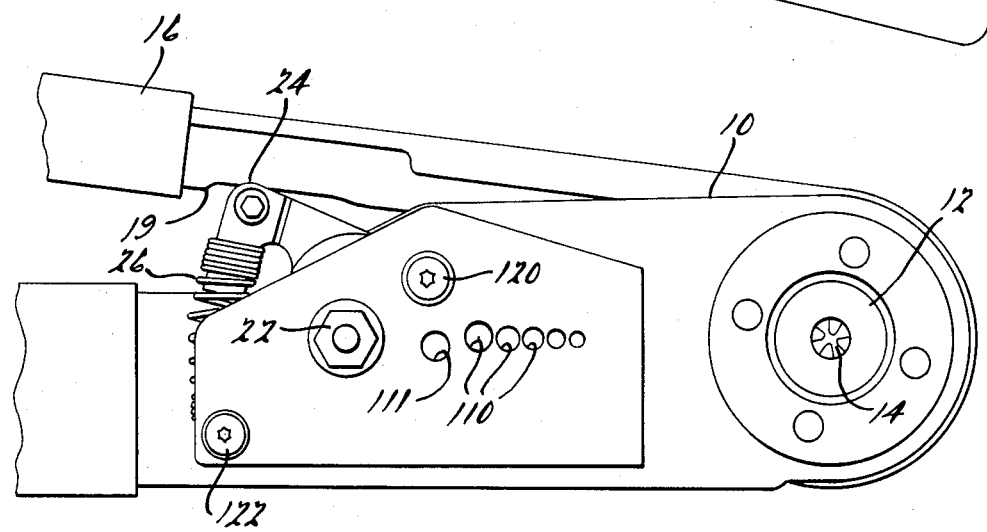
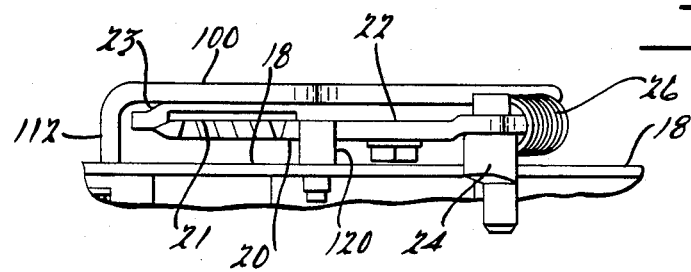

WIRE INSULATION STRIPPER GUIDE

BACKGROUND OF THE INVENTION

1. Field of the Invention

The present invention is directed to the field of electrical wire insulation strippers and more specifically to a device for preventing wire strands from being cut during removal of insulation.

2. Description of the Prior Art

Conventional hand tools for crimping electrical connectors, such as those shown in U.S. Pat. Nos. 3,199,334 and 3,738,150 contain sockets for accepting hollow connectors to be crimped. By selecting an appropriate size of the socket, various sized connectors may be held for crimping. In each case, the wire to be inserted into the electrical connector prior to crimping must be stripped of its insulation, preferably to a predetermined length. Usually such stripping operation was required to be performed separately on specific stripping tools prior to inserting the wire into the electrical connector for crimping. Of course, the use of several hand tools to perform the separate stripping and crimping operations is somewhat inefficient.

SUMMARY OF THE INVENTION

The present invention allows for the use of a wire stripping device residing on a conventional hand tool for crimping electrical connectors by providing an alignment guide to orient the wire with respect to the insulation die cutter and restrict removal of the wire to the alignment direction. Such alignment of the wire during removal prevents wire strands from being inadvertently severed along with the insulation.

In addition, the present invention provides for a plurality of apertures corresponding to the number of separate die cutting apertures formed by the insulation die cutter, and appropriately sized for different wire gages.

BRIEF DESCRIPTION OF THE DRAWINGS

FIG. 1 is an exploded perspective view of the present invention employed in combination with a hand tool for crimping electrical connectors.

FIG. 2 is a top plan view of the assembly incorporating the present invention.

FIG. 3 is an elevational plan view of the present invention.

DETAILED DESCRIPTION OF THE PREFERRED EMBODIMENT

In FIG. 1, a hand tool for crimping electrical connectors 10 is shown. The hand tool comprises a relatively movable handle 16 that is pivotable to actuate a crimping device 14 within a socket element 12. An insulation stripper element is shown mounted on the upper surface 18 and includes a fixedly mounted upper die cutter portion 23 having a plurality of die cutting edges 25 appropriately spaced and configured to cut the outer insulated coating on different sized (gage) wires. The insulation stripper further includes a moveable lower die cutter portion 20 having a corresponding plurality of die cutting edges 21. The lower die cutter portion 20 is attached to the fixedly mounted upper die cutter portion 23 by a pivot connection 22.

The upper die cutter 23 is connected through spacers 120 and 122 to the upper surface 18 and separated therefrom by a predetermined distance.

A coil spring 26 is connected between the die cutter portions 20 and 23 so as to hold them in a normally opened position. Limiting contacts 26 and 27 serve to restrict closure of the movable die cutter edges 21 with respect to the fixed die cutter edges 25 so that each aperture formed by the die cutting edges is for a precise wire gage clearance. A cam 24 is located adjacent one end of the spring 26 as an extension of the movable die cutter portion 20 so as to be contacted by an inner cam surface 19 of the pivotable handle 16 near its maximum closure position.

A guide plate 100 is attached above the insulation die cutter to spacers 120 and 122 and is additional supported above the upper surface 18 by a leg 112 to maintain its rigidity. A plurality of apertures 110 are disposed on the guide plate 100, in a predetermined arrangement to correspond with the individual die cutter edges 25 underlying the plate. The apertures 110 are graduated in size and correspond to the diameter of insulated wire of the appropriate gage size of the underlying die cutter edges. Appropriate indicia indicating wire gage may be placed adjacent the apertures 110 so as to assist the operator in locating the precise aperture for insertion. An additional aperture 111 is provided to direct the operator to insert a wire of a wide range of gages for cutting by a cutting portion of the die cutter underlying the plate 100.

Without the plate 100, actual wire trimming could be achieved by utilizing only the die cutter attachment to the hand tool 10. However, it has been found that once the die cutter edges are closed on an insulated wire of the proper gage, the removal and stripping of the insulation often results in additional strands of the wire being cut and removed with the stripped insulation. This is due to the inadvertent tendency for one to pull the wire from the teeth of the die cutter elements at an angle removed from the normal. This causes the die cutting edges to dig into the wire strands and severe those strands. Of course, the reduced number of strands may cause an inferior crimp connection when the exposed wire strands are later inserted into an electrical connector for crimping in the hand tool.

The plate 100 provides vertically aligned apertures which are of correct size so as to ensure that the larger wires are inserted into the larger die cutter elements and to also ensure that the withdrawal of the wire after cutting of the insulation is along the axial line defined between the center of the apertures 110 and the apertures defined by the closed die cutting elements. This alignment ensures that the wire is properly withdrawn from the die cutting edge and that only insulation is removed.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. In combination with a wire terminal crimping tool having a pair of separate and pivotable handles and an insulation cutter mounted at a predetermined height above one of said handles with one fixed die and one movable die pivotable with respect to said fixed die to precisely cut the insulation portion of an insulated wire inserted therein at a distance from the end of said wire that does not exceed said predetermined heighth distance, an improvement comprising:

plate means fixedly mounted above said fixed die of said insulation cutter and defining at least one aperture corresponding to the diameter of the insulated wire insertable for cutting by said insulation cutter and aligned in an axial direction therewith to restrict removal of said wire from said insulation cutter to said axial direction.

2. A combination as in claim 1, wherein said rigid die and said movable die of said insulation cutter each contain cutting edges that when oriented to cut said insulation define a plurality of apertures corresponding to the gage size of the conductor portion of an insulated wire and said improvement includes said plate means having a plurality of apertures correspondingly aligned with said defined apertures of said insulation cutter.

* * * * *